United States Patent
Mandawaria et al.

(10) Patent No.: US 12,501,424 B2
(45) Date of Patent: Dec. 16, 2025

(54) METHODS FOR SCHEDULING UPLINK TRANSMISSIONS FOR NON-TERRESTRIAL NETWORKS

(71) Applicant: SAMSUNG ELECTRONICS CO., LTD., Suwon-si (KR)

(72) Inventors: Vikalp Mandawaria, Bangalore (IN); Diwakar Sharma, Bangalore (IN); Neha Sharma, Bangalore (IN); Anshuman Nigam, Bangalore (IN); Aneesh Deshmukh, Bangalore (IN); Chitradeep Majumdar, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 547 days.

(21) Appl. No.: 17/880,133

(22) Filed: Aug. 3, 2022

(65) Prior Publication Data
US 2023/0047384 A1    Feb. 16, 2023

Related U.S. Application Data

(63) Continuation of application No. PCT/KR2022/011418, filed on Aug. 2, 2022.

(30) Foreign Application Priority Data

Aug. 3, 2021 (IN) .............................. 202141034933
Jul. 22, 2022 (IN) .............................. 202141034933

(51) Int. Cl.
*H04W 72/1268* (2023.01)
*H04B 7/01* (2006.01)
(Continued)

(52) U.S. Cl.
CPC .......... *H04W 72/1268* (2013.01); *H04B 7/01* (2013.01); *H04W 72/23* (2023.01); *H04W 84/06* (2013.01)

(58) Field of Classification Search
CPC . H04W 72/1268; H04W 72/23; H04W 84/06; H04W 72/121; H04W 72/232; H04B 7/01; H04B 7/2041; H04B 7/18513
See application file for complete search history.

(56) References Cited

U.S. PATENT DOCUMENTS 6,553,225 B1    4/2003   Zhao et al.
2017/0026110 A1*  1/2017   Richardson .......... H01Q 1/1257
(Continued)

FOREIGN PATENT DOCUMENTS

CN    116830485 A * 9/2023  ........... H04L 5/0048
JP    2019-047262     3/2019
(Continued)

OTHER PUBLICATIONS

Technical Report, 3GPP TR 38.821 V16.0.0., 3$^{rd}$ Generation Partnership Project Technical Specification Group Radio Access Network; Solutions for NR to support non-terrestrial networks (NTN), Dec. 2019, 140pp.

(Continued)

*Primary Examiner* — Nizam U Ahmed
(74) *Attorney, Agent, or Firm* — NIXON & VANDERHYE P.C.

(57) ABSTRACT

The various embodiments herein disclose methods and systems for uplink scheduling schemes for low-earth orbit (LEO) satellite based Non-Terrestrial Network (NTN). According to an embodiment, a zone-based scheduling (ZBS) scheme is described where the coverage area may be divided into a plurality of zones and independent scheduling-offsets may be allocated for each of the zones. The ZBS scheme improves upon the overall user latency by reducing the K2 and cell offset delay for low-propagation delay users within the NTN cells. At the same time, the impact of (Continued)

differential doppler may also be mitigated with such a zone-based allcoation strategy.

16 Claims, 8 Drawing Sheets

(51) Int. Cl.
  *H04W 72/23* (2023.01)
  *H04W 84/06* (2009.01)

(56) References Cited

U.S. PATENT DOCUMENTS

| | | | |
|---|---|---|---|
| 2017/0237482 | A1 | 8/2017 | Noerpel et al. |
| 2020/0068567 | A1* | 2/2020 | Islam .................. H04L 5/0055 |
| 2020/0076497 | A1 | 3/2020 | Agarwal et al. |
| 2020/0295824 | A1* | 9/2020 | Charbit ................ H04L 1/1864 |
| 2021/0288715 | A1 | 9/2021 | Gao et al. |
| 2021/0306069 | A1 | 9/2021 | Yan et al. |
| 2022/0150858 | A1 | 5/2022 | Ren et al. |
| 2024/0163825 | A1* | 5/2024 | Park ..................... H04W 72/20 |

FOREIGN PATENT DOCUMENTS

| | | |
|---|---|---|
| WO | 2017/072745 | 5/2017 |
| WO | 2020/031155 | 2/2020 |
| WO | 2020/119494 | 6/2020 |
| WO | 2020/164362 | 8/2020 |
| WO | 2020/198671 | 10/2020 |
| WO | 2021/033094 | 2/2021 |
| WO | 2021/035938 | 3/2021 |
| WO | 2021/150605 | 7/2021 |

OTHER PUBLICATIONS

Extended European Search Report dated Sep. 18, 2024 issued in European Patent Application No. 22853438.4.
Search Report and Written Opinion dated Nov. 2, 2022 issued in International Patent Application No. PCT/KR2022/011418.
3GPP, "TSG RAN; Solutions for NR to support non-terrestrial networks (NTN)", (Release 16), Jun. 30, 2021, 142 pages.
3GPP, "TSG RAN; Study on New Radio (NR) to support non-terrestrial networks", (Release 15), Oct. 8, 2020,129 pages.
3GPP, R1-2105697,"Discussion on timing relationship enhancements for NTN", May 12, 2021,10 pages.

* cited by examiner

METHODS FOR SCHEDULING UPLINK TRANSMISSIONS FOR NON-TERRESTRIAL NETWORKS

CROSS-REFERENCE TO RELATED APPLICATIONS

This application is a continuation of International Application No. PCT/KR2022/011418, designating the United States, filed on Aug. 2, 2022, in the Korean Intellectual Property Receiving Office and claiming priority to Indian Provisional Patent Application number 202141034933, filed on Aug. 3, 2021, in the Indian Patent Office, and to Indian Complete Patent Application number 202141034933, filed on Jul. 22, 2022, in the Indian Patent Office, the disclosures of each of which are incorporated by reference herein in their entireties.

BACKGROUND

Field

The disclosure relates to wireless communications, and for example, to methods and systems for uplink scheduling schemes for a plurality of user equipment (UEs) in a Non-Terrestrial Network (NTN) System for communication.

Description of Related Art

In recent years, several broadband wireless technologies have been developed for providing better applications and services to meet the growing requirements of broadband subscribers. For example, a second generation (2G) wireless communication system has been developed to provide voice services while ensuring the mobility of users.

Similarly, a third-generation (3G) wireless communication system supports not only the voice service but also data service. In recent years, a fourth-generation (4G) wireless communication system has been developed to provide high-speed data service. However, currently, the fourth-generation (4G) wireless communication system has suffered from a lack of resources to meet the growing demand for high-speed data services. A fifth-generation (5G) wireless communication system overcomes this issue and meets the ever growing demand for high speed data services. Furthermore, the fifth-generation wireless communication system provides ultra-reliability and supports low latency applications.

For a sixth generation (6G) of wireless communication systems, e.g., 6G, various technologies have been under consideration, for example, Visible Light Communication (VLC), Terahertz band (THz), e.g., frequencies from 100 GHz to 3 THz, Infrared wave and Ultraviolet wave, Non terrestrial networks (NTNs) etc.

One of the important use case areas in the 6G is to promote ubiquitous and high-cápacity global connectivity. NTN is key research area which can provide high-capacity connectivity in future 6th generation (6G) wireless networks. Furthermore, to provide coverage to the network devices distributed all over the globe, NTNs have been recognized to complement and extend the terrestrial network to remote areas, and thus, NTNs have been gaining recognition lately.

The NTNs are expected to foster the roll out of 6G/B5G service in unserved areas that cannot be covered by terrestrial networks (isolated/remote areas, on board aircrafts or vessels) and underserved areas (e.g., sub-urban/rural areas) to upgrade the performance of limited terrestrial networks in a cost-effective manner. The NTNs will impact coverage, user bandwidth, system capacity, service reliability or service availability, energy consumption, connection density, etc. An NTN includes spaceborne as well as airborne network. The spaceborne network includes geostationary earth orbit (GEO), low earth orbit (LEO) and medium earth orbit (MEO) satellites while access network based on Unmanned Aerial System (UAS) including High Altitude Platform Station (HAPS) could be considered as a special case of non-terrestrial access with lower delay/doppler value and variation rate.

The NTN network which is based on satellites and UAS or HAPS can be used to improve the coverage as well as improve the capacity of the system.

In recent years, the NTNs have emerged as a promising solution to complement terrestrial networks (TNs) for global coverage extension. The primary role of an NTN is to complement the TN services in remote areas, to improve the TN service reliability, especially for mission-critical services.

FIG. 1 is a diagram illustrating a non-terrestrial network system 100 for providing access to user equipment (UE), according to the prior art. The system 100 includes a UE, a satellite or UAS platform, and a gateway.

The non-terrestrial network refers to a network, or a segment of networks using RF resources on board a satellite (or a UAS platform). As per TR 38.821, an NTN typically features one or several sat-gateways that connect the Non-Terrestrial Network to a public data network. A GEO satellite is fed by one or several sat-gateways which are deployed across the satellite targeted coverage (e.g., regional or even continental coverage).

The UE located in a cell may be served by only one sat-gateway. A Non-GEO satellite may be served successively by one or several sat-gateways at a time. The system ensures service and feeder link continuity between the successive serving sat-gateways with sufficient time duration to proceed with mobility anchoring and hand-over. A Feeder link is a radio link between a sat-gateway and the satellite (or UAS platform). A service link is a radio link between the user equipment and the satellite (or UAS platform). A satellite (or UAS platform) may implement either a transparent or a regenerative (with on board processing) payload. The satellite (or UAS platform) generates a plurality of beams over a given service area bounded by its field of view. The footprints of the beams are typically of elliptic shape. The field of view of a satellite (or UAS platform) may depend on the on-board antenna diagram and minimum elevation angle. A transparent payload has Radio Frequency filtering, Frequency conversion and amplification. Hence, the waveform signal repeated by the payload is un-changed.

A regenerative payload has Radio Frequency filtering, Frequency conversion and amplification as well as demodulation/decoding, switch and/or routing, coding/modulation. This is effectively equivalent to having all or part of base station functions (e.g., gNB) on-board the satellite (or UAS platform). Inter-satellite links (ISL) are optionally provided in case of a constellation of satellites. This will require regenerative payloads on board the satellites. The ISL may operate in RF frequency or optical bands. The UE is served by the satellite (or UAS platform) within the targeted service area. There may be different types of satellites (or UAS platforms) listed here under Table (1).

The propagation delays or Max Round Trip Delay is an amount of time that a signal takes to travel from the sender to the receiver. Timing Advance (e.g., 2× propagation delay)

is a special command/notification that is sent from base station (gNB) to the UE that enables the UE to adjust its uplink transmission. This kind of UL adjustment applies to Physical Uplink Shared Channel (PUSCH), Physical Uplink Control Channel (PUCCH) and Sounding Reference Signals (SRS). In terrestrial mobile systems, the propagation delays are zero as timing advance is less than a microsecond. The propagation delays in NTNs are much longer, ranging from several milliseconds to hundreds of milliseconds based on the altitudes of the spaceborne or airborne platforms and payload type in the NTN. As an example, the propagation delay ranges for transparent payload: service and feeder links is 25.77 ms (600 km) and 41.77 ms (1200 km) for LEO satellites. For GEO, the delay is 541.46 ms (service and feeder links) and 270.73 ms (service link only). Such long propagation delays require modifications of many timing aspects in NR from physical layer to higher layers, including the timing advance (TA) mechanism, measurement, CQI, HARQ procedure, scheduling, etc.

TABLE 1

| Platforms | Altitude range | Orbit | Typical beam footprint size |
| --- | --- | --- | --- |
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

The base station (gNB) measures the propagation delay in a RACH message-1 received from the UE. Accordingly, for PUSCH, PUCCH or SRS transmissions, the UE transmission is advanced by a timing advance=2*propagation-delay for DL/UL alignment.

FIG. 2 is a diagram illustrating an uplink grant allocation protocol for UE transmissions in 5G NR, according to the prior art.

As per TR 38.821, when data arrives in the buffer, a typical procedure is to trigger a Buffer Status Report (BSR), and if the UE does not have any uplink resources for transmitting the BSR, the UE will request for resources using a scheduling request. The scheduling request is only an indication signalling to the network that the UE requires scheduling. However, based on the scheduling request, the network will not know the full extent of the resources required to schedule the UE. Thus, the network may typically schedule the UE with a grant large enough to send a BSR, so that the network may schedule the UE more accordingly, as shown in FIG. 2.

In non-terrestrial networks, the drawback of the scheduling procedure is that it would take at least 2 round-trip times from data arriving in the buffer at the UE side until it can be properly scheduled with resources that would fit the data and the required Quality of Service (QoS). Due to the large propagation delays, this may become prohibitively large. The large propagation delay can further increase the scheduling delay which can impact the user experience.

Referring to FIG. 2, for scheduled access, once data arrives at user's Radio Link Control (RLC) queues, at step-I, the user requests for a UL grant by sending a scheduling request (SR) to the gNB over the physical uplink control channel, PUCCH.

At step-II, the gNB sends the UL grant (Downlink Control Information (DCI) in PDCCH) to indicate the scheduling decision to the UE. DCI formats 0_0 and 0_1 carry 4-bit field named 'time domain resource assignment' which points to one of the rows of a look-up table. Each row in the look-up table provides the following parameters;
  a) Slot-offset K2. Upon reception of an UL grant by the UE, the UL transmission (e.g., data and/or BSR) is sent after K2 slots, e.g., Ke delay. It is the waiting time for the UE before the actual UL transmission (e.g., data and/or BSR).
  b) SLIV (jointly coded Start and Length Indicator Values), or individual values for the start symbol 'S' and the allocation length 'L'. These parameters indicate the first symbol and the length to be transmitted by the UE, and
  c) 'PUSCH mapping type' to be applied on the PUSCH transmission is which helps in determining the demodulation reference signals' (DM-RS) starting position.

Further, at step-III, after receiving the UL grant, the UE performs the data transmission in the allocated resources over PUSCH, which may contain UL data and/or buffer status report (BSR).

Furthermore, at step-IV, if a BSR is received, the gNodeB knows the user's buffer status and can provide the user with another UL grant to transmit the remaining data.

However, the current scheduling mechanisms are not suitable for users served by LEO satellites or any other satellites as performance of users is impacted due to high propagation delay, large differential delay within NTN cells, high doppler effect causing frequency offset. The impact of high differential delay and doppler effects for low-earth orbit (LEO) satellites would drastically impact the performance NR-NTN users.

Accordingly, there is a need to devise new scheduling schemes which can address the high differential delay, propagation delay, and doppler effects for LEO satellites.

SUMMARY

According to an example embodiment of the present disclosure, a method at a base station for scheduling uplink transmissions for a plurality of user equipment (UEs) in a non-terrestrial network (NTN) is disclosed. The method comprises: dividing, by the base station, a coverage area of a spot-beam associated with an NTN cell into a plurality of NTN zones based on a differential delay and a differential doppler shift associated with the plurality of UEs, wherein each of the plurality of NTN zones comprises one or more UEs from among the plurality of UEs; determining, by the base station, a scheduling offset for each of the plurality of NTN zones based on a maximum value of propagation delay among the one or more UEs and a processing delay associated with each of the one or more UEs of the corresponding NTN zone; allocating, by the base station, one or more uplink 1s resource block for each NTN zone based on the determined scheduling offsets associated with the plurality of NTN zones; allocating, by the base station, to the one or more UEs within each NTN zone, the one or more uplink resource blocks based on a specified scheduling scheme; and transmitting, by the base station, a downlink control information to the plurality of UEs indicating the allocation of the one or more uplink resource blocks to schedule the uplink transmissions from the plurality of UEs.

According to an example embodiment of the present disclosure, a base station configured to schedule uplink transmissions for a plurality of user equipment (UEs) in a non-terrestrial network (NTN) is provided. The base station comprises: at least one controller configured to: divide a coverage area of a spot-beam associated with an NTN cell into a plurality of NTN zones based on a differential delay and a differential doppler shift associated with the plurality of UEs, wherein each of the plurality of NTN zones comprises one or more UEs from among the plurality of UEs; determine a scheduling offset for each of the plurality of NTN zones based on a maximum value of propagation delay among the one or more UEs and a processing delay associated with each of the one or more UEs of the corresponding NTN zone; allocate one or more uplink resource blocks for each NTN zone based on the determined scheduling offsets associated with the plurality of NTN zones; allocate to the one or more UEs within each NTN zone, the one or more uplink resource blocks based on a specified scheduling scheme; and transmit a downlink control information to the plurality of UEs indicating the allocation of the one or more uplink resource blocks to schedule the uplink transmissions from the plurality of UEs.

To further clarify the advantages and features of the present disclosure, a more detailed description will be provided with reference to various example embodiments thereof, which are illustrated in the appended drawings. It is appreciated that these drawings depict example embodiments of the disclosure and are therefore not to be considered limiting of its scope. The disclosure will be described and explained with additional specificity and detail with reference to the accompanying drawings.

BRIEF DESCRIPTION OF THE DRAWINGS

The above and other aspects, features and advantages of certain embodiments the present disclosure will be more apparent from the following detailed description, taken in conjunction with the accompanying drawings, in which.

Figure 1:
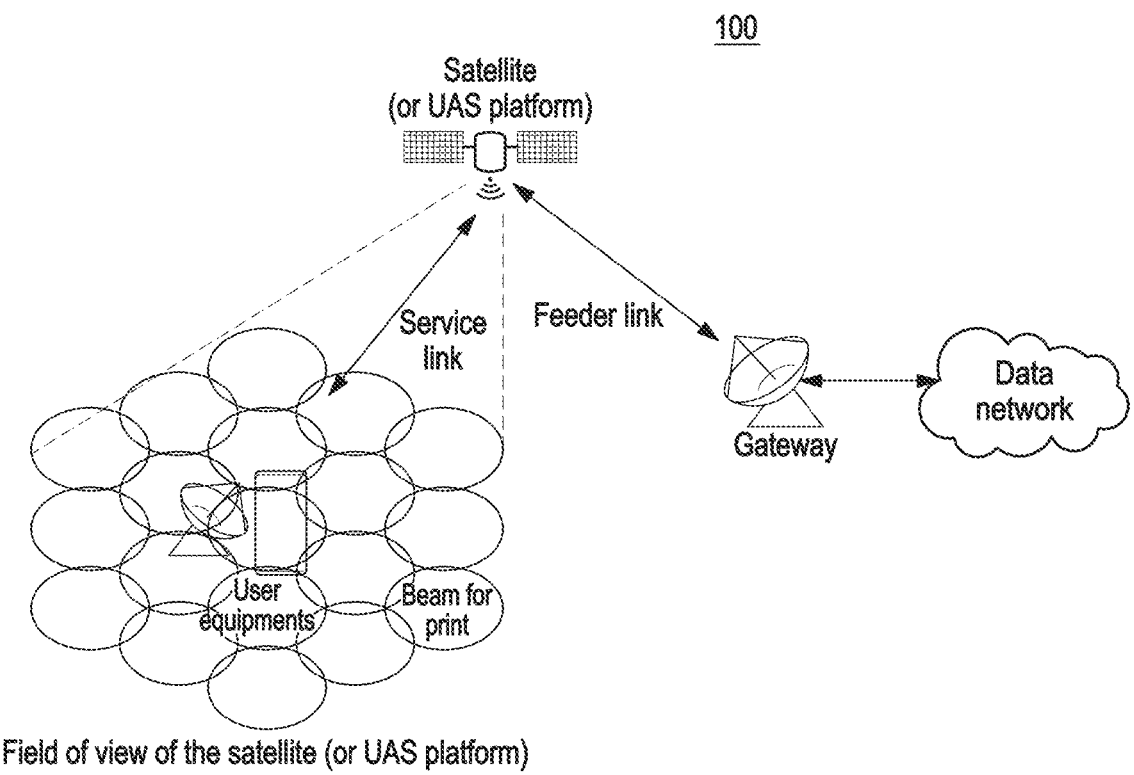
FIG. 1 is a diagram illustrating a conventional (prior art) non-terrestrial network system 100 for providing access to user equipment (UE)
Figure 2:
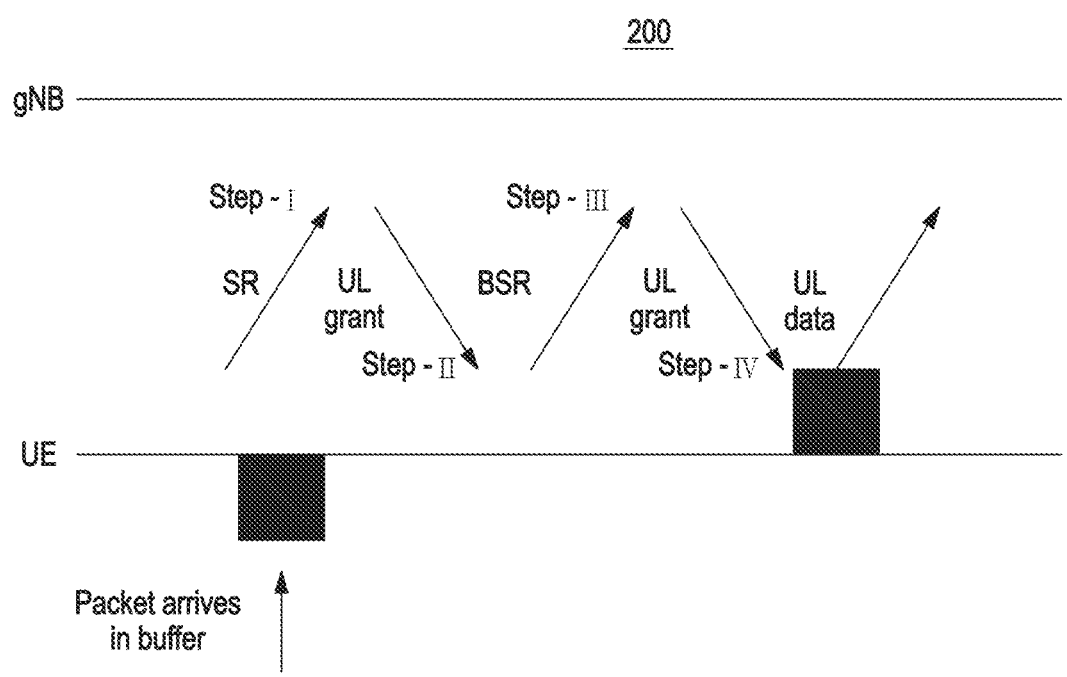
FIG. 2 is a diagram illustrating an uplink grant allocation protocol for UE transmissions in 5G NR, according to the prior art.

Further, skilled artisans will appreciate that elements in the drawings are illustrated for simplicity and may not have been necessarily been drawn to scale. For example, the flowcharts illustrate the method in terms of operations involved to help to improve understanding of aspects of the present disclosure. Furthermore, in terms of the construction of the device, one or more components of the device may have been represented in the drawings by conventional symbols, and the drawings may show those specific details that are pertinent to understanding the various embodiments of the present disclosure so as not to obscure the drawings with details that may be readily apparent to those of ordinary skill in the art having the benefit of the description herein.

DETAILED DESCRIPTION

For the purpose of providing an understanding of the principles of the disclosure, reference will now be made to the various example embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would be apparent to one skilled in the art.

It will be understood by those skilled in the art that the foregoing general description and the following detailed description are explanatory and are not intended to be restrictive.

Reference throughout this disclosure to "an aspect", "another aspect" or similar language may refer, for example, to a particular feature, structure, or characteristic described in connection with an embodiment being included in at least one embodiment of the present disclosure. Thus, appearances of the phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The Low Earth Orbit (LEO) and GEO NTNs face several unprecedented challenges over 5G-NR protocol. For example, in satellite systems, the propagation delays are long when compared to TNs' delays due to large propagation distances between the user and the satellite. Besides this, due to high speed of the LEO satellites, high doppler variation also impacts the performance of LEO-NTN users. An NTN cell is expected to cover an area as wide as 1000 Kms in diameter due to which each NTN cell may have users with different propagation delays. The maximum differential delay within one NTN cell is 10.3 ms for GEO and 3.18 ms for LEO, and therefore, the latency of the users within the same beam is severely impacted.

Moreover, the high doppler shift and the differential Doppler shift among the subcarriers would significantly impact the received symbols. In downlink, the doppler shift can be assumed to be appropriately compensated assuming perfect estimation of Doppler shift at the satellite-gateway, e.g., a frequency offset will be applied in the transmitted frequency such that the signal will appear to have zero Doppler shift when it is received by the desired UE. For the uplink case, the frequency offset can be applied to the received frequency instead.

Differential Doppler part can also be compensated for, if each individual NTN-user can also estimate and compensate its differential Doppler shift appropriately before transmitting the signal. However, this would significantly raise the complexity on the user side, since it would require a continuous estimation of the satellite position taking into account the vision of very low cost and low complexity devices. Thus, differential doppler may not be compensated for at the user devices.

To address the high delay and doppler issues, a solution may be adopted such as reducing the beam width (e.g., NTN cell coverage) in order to handle the large differential delay and residual frequency offset of UEs within the satellite beams. However, the implementation of this solution requires a complex antenna technology that may lead to increased size and power consumption of the low Earth orbit (LEO) satellite. Moreover, with increased spot-beams per satellite, the number of handovers would increase drastically, which may impact the performance of NTN users significantly. Thus, there is a need to provide a mechanism which address all these issues and provide better user experience when it is served with NTN.

For uplink transmissions, the UE must have the time to prepare the data to send, and therefore, the gNodeB takes the uplink scheduler decision in advance, and then sends the uplink grant taking into account these timings. This advance decision depends on scheduler offset. Once the UE receives the grant, it transmits the data after K2, wherein K2 is the offset between the DL slot where the PDCCH(DCI) for uplink scheduling is received and the UL slot where the UL data needs to be sent on PUSCH.

Moreover, in the current 5G systems, which is based on terrestrial network (TN), the timing advance (TA) is in the range of ~μs, and as a result, a pre-specified scheduling offset is considered common for all users. The current scheduling schemes is designed for TN users where timing advance did not increase much based on how far or near UE is to the network. As the propagation delay is almost 0 in TNs, so the scheduling offset or advance which determines how many slots in advance the NW schedules to the UE is same for all the devices within a particular cell, but this may not be suitable for NTN systems due to huge coverage within an NTN cell.

Thus, for NTN systems, users which are served by satellite will have different propagation delays (from 8 ms to 25.77 ms). If the same scheduling offset is decided for all users (based on cell-edge NTN users), the latency for users close to the satellite would rise and the throughput will drop drastically.

According to various embodiments disclosed herein, methods and systems are provided for uplink scheduling schemes for low-earth orbit (LEO) satellite based Non-Terrestrial Network (NTN) Systems. According to an embodiment, a zone-based scheduling (ZBS) method is described where the coverage area may be divided into zones and independent scheduling-offsets may be allocated for each of the zones. The ZBS method improves upon the overall user latency by reducing the K2 and cell offset delay for low-propagation delay users within the NTN cells. Additionally, the impact of differential delay and doppler may also be mitigated with such a zone-based allcoation strategy.

In an embodiment of the present disclosure, an impact of high propagation delay, large differential delay within the NTN cell, high doppler effect and frequency offsetting for NTN on the 5G-NR resource allocation and MAC protocol is illustrated. The present disclosure includes an uplink zone-based scheduling method for a NR-NTN LEO satellite-based NTN systems, to address the high differential delay and doppler effects for LEO satellites. The performance of the disclosed strategy is validated through numerical simulations and then compared with the conventional approach in 5G-NR protocol.

Figure 3:
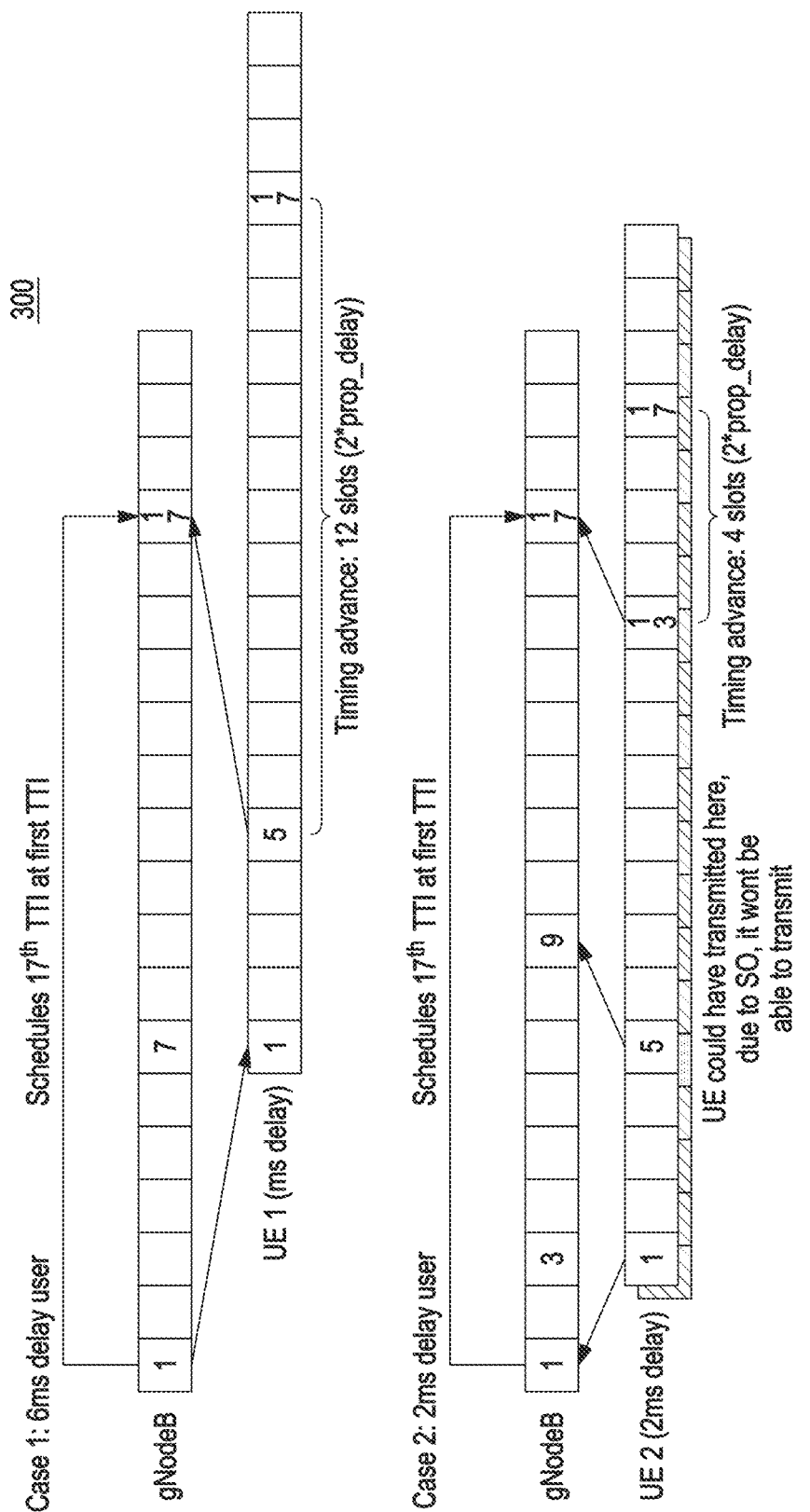
FIG. 3 is a diagram illustrating an example impact of scheduling delay due to common scheduling offset, according to the prior art.

FIG. 3 is a diagram illustrating an impact of scheduling delay due to common scheduling offset in NTN systems, according to the prior art. As illustrated in FIG. 3, the impact of scheduling delay due to common scheduling offset has been shown for two users with different propagation delays. In the illustrated example, the UE1 may have a propagation delay of 6 ms, while the UE2 may have a propagation delay of 2 ms. The different propagation delays may be based on different locations of the UEs within an NTN cell coverage.

As widely known in the art, the waiting-time for the UE after receiving the grants and before actual transmission is known as K2-delay. For example, K2 delay is the delay (in unit of slots, expressed in Transmission Time Intervals (TTIs)) between an uplink grant reception and the corresponding uplink data transmission. Further, the timing advance is indicated with the help of K2 delay. Therefore, K2 delay and the start and length indicator SLIV of the scheduling DCI includes the effect of the timing advance (as also indicated in TS-38.214).

Further, as also widely known, the gNodeB schedules the TTIs slightly in advance. This advance is referred to as scheduling offset. For an example, with scheduling offset=16 TTIs, gNodeB will schedule 17th TTI in 1st TTI, 18th TTI in 2nd TTI and so on.

For a feasible transmission, K2 delay (e.g., UE's waiting time) cannot be less than the UE's processing delay, e.g., UE cannot send data before it completes processing grants.

Thus, the K2 delay=Scheduling Offset−Timing Advance (=2*propagation-delay)>=UE's processing delay.

Therefore, a minimum scheduling offset so that an uplink transmission is feasible is processing delay+2*propagation delay. Conversely, the scheduling delay or offset is equal to 2*max_prop_delay+processing delay.

Referring to FIG. 3, as illustrated, the gNodeB may transmit grant to the UE1, which may be received at the UE1 after a propagation delay of 6 ms. Subsequently, the UE1 may wait for K2 delay, e.g., 4 slots (predefined) before transmitting in uplink at its 5th TTI. Once the UE transmits the uplink data, the gNodeB receives uplink transmission in the gNodeB's $17^{th}$ slot, which was scheduled in first TTI by the gNodeB.

In this case, as maximum propagation delay is 6 ms and the network scheduler is designed for common scheduling offset, so the scheduling offset or uplink scheduling delay would be set as 16 ms (6 ms worst-case propagation delay to send grants+4 ms to processing the received grants+6 ms worst-case propagation-delay for gNodeB to receive user data).

Accordingly, the processing delay is the L1-L2 processing delay which occurs at the gNB and as well at the UE side. Also, upon reception of an UL grant by the UE, the UL transmission (e.g., data and/or BSR) is sent after K2 slots, where K2 is indicated in the UL grant provided in DCI of physical channel. Typically this processing delay is equal to 4 slots, so the scheduling delay is 16 ms for users with propagation delay of 6 ms. In such existing techniques, the network uses same scheduling offsets for all the UEs within the same cell. To serve all the UEs, the scheduling delay is set as 16 ms. This may be undesired for UE2 for which propagation delay is less than 6 ms.

As an example, for UE2, which is near to satellite and has a propagation delay of 2 ms, the uplink transmission would be scheduled with the same offset which will significantly increase the latency and may impact the user experience and throughput. The UE2 with 2 ms delay could have transmitted data at slot 5 only after the processing, which is typically K2 offset, but due to common scheduling offset, the UE2 transmits at slot 13 (K2-delay=Scheduling Offset-2*prop-delay=16-2*2=12 TTIs). This time is informed by the network through new offset or cell specific offset. The gNodeB shall receive data from both UE1 and UE2 in $17^{th}$ TTI.

The latency for the 2 ms UE2 is being unnecessarily increased by 8 ms for each transmission due to the high differential delay within the same satellite beam. Therefore, in any set-up, the latency for low propagation-delay is being severely impacted because of the conventional protocol.

Thus, differential delay may be referred to as the difference between the maximum and minimum propagation delays in a NTN cell. For terrestrial networks, differential delay within each cell is negligible, e.g., there is negligible difference in propagation delays between users and as a result same scheduling offset can be considered for all users. However, differential delay per cell (since each cell corresponds to a spot beam in NTN) in NTN (Reference: TR38.821) is illustrated in below Table 2:

TABLE 2

| | LEO 600 Km | LEO 1200 Km | GEO |
|---|---|---|---|
| Max. Differential Delay per NTN cell | 3.12 ms | 3.18 ms | 10.3 ms |

Further the impact of high differential delay and doppler effects for low-earth orbit (LEO) satellites would drastically impact the performance of NR-NTN UEs. This will further impact the user throughput and experience. Accordingly, there is a strong need to provide a new scheduling mechanism which can be more suitable for NTN systems and cater the above issues.

Additionally, the difference between the maximum and minimum frequency shifts (frequency shifts happen due to gNodeB or UEs' mobility) for any two users within an NTN cell is referred to as Differential Doppler Shift. Since LEO satellites move at high speeds, differential Doppler shifts are very high for NTN users. Doppler shifts may be divided into common (doppler shift common to all users) and differential parts. The common part of the Doppler shift can be ideally pre-compensated in the downlink, or post compensated at the receiver in uplink, e.g., at the satellite or gateway. As an example, the Doppler shift may vary between +/−4200 kHz for an NTN user connected to a LEO satellite at a height of 600 km. Though, in uplink transmissions, the subcarriers assigned to different NTN users will arrive at the satellite with different Doppler shifts, negating the orthogonality in the final OFDM signal and degrading the performance of the NTN users.

This performance degradation coming from the differential Doppler part of the Doppler shift in uplink can be compensated for, if each individual NTN user/UE may also estimate and compensate its differential Doppler shift appropriately before transmitting the signal. However, this would significantly raise the complexity on the user side, since it would require a continuous estimation of the satellite position and would not be possible for low complexity devices and will raise power consumption at UE side.

In a terrestrial network, the differential Doppler shift occurs due to the mobility of the users on Earth. In fact, using 3GPP specification about mobile UEs, carrier frequency 2 GHz, 15 kHz SCS and maximum UE speed of 500 km/h, it can be derived that the standard can support up to 950 Hz of Doppler shift among subcarriers. This may refer, for example, to the standard itself being able to mitigate a loss of orthogonality of up to 950 Hz. However, for NTNs with mobile satellites, the differential Doppler will be much higher. Therefore, alternative mechanisms are needed to deal with differential Doppler issue.

To address all the above issues, a Zone Based Scheduling (ZBS) method is disclosed herein. The ZBS method reduces both the differential delay and the doppler effects, and the scheduling-advance or offset for low-propagation delay users, to improve on the overall system performance of NTN networks.

Figure 4:
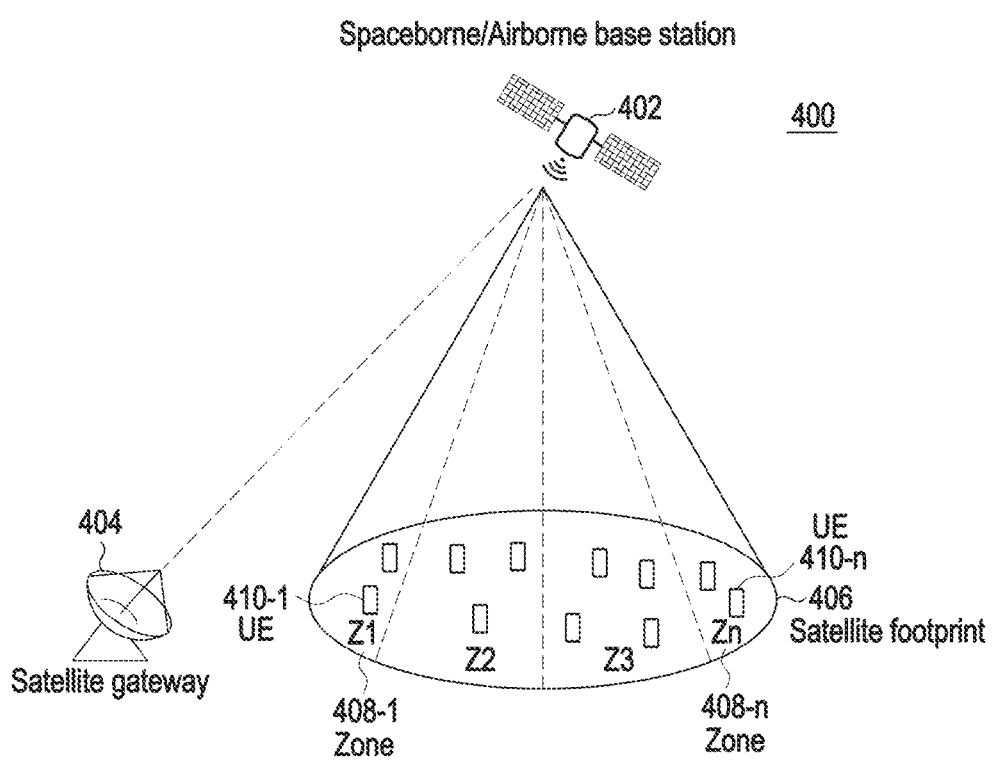
FIG. 4 is a diagram illustrating an example NTN system for scheduling uplink transmissions for a plurality of user equipment (UEs), according to various embodiments.

FIG. 4 is a diagram illustrating an example NTN system 400 for scheduling uplink transmissions for a plurality of user equipment (UEs), according to various embodiments. The system 400 corresponds to the ZBS method as discussed throughout this disclosure According to an embodiment, the NTN system 400 comprises a spaceborne/airborne base station 402, a satellite gateway 404, and a plurality of UEs 410-1 to 410-n. The NTN system 400 may cover a broad range of airborne (e.g., High Altitude UAS Platforms (HAPs)) or spaceborne (e.g., Satellites (LEO, MEO, GEO)) vehicles for transmission, and each may have a different round trip propagation delay.

Each of the UEs 410-1 to 410-n may be any type of device configured to operate and/or communicate in a wireless environment. By way of example, the UEs 410-1 to 410-n, may be configured to transmit and/or receive wireless signals and may include a a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a device operating on commercial and/or industrial wireless networks, and the like.

The base station 402 may communicate with the plurality of UEs 410-1 to 410-n located approximately at the Earth's surface. There may be a satellite footprint 406 with a specific diameter corresponding to a spot beam of the satellite, which may also be considered to be the NTN cell associated with the base station 402. The base station 402 may be configured to transmit and/or receive wireless signals on one or more carrier frequencies, which may be referred to as a cell 406 associated with the spot beam. These frequencies may be in licensed spectrum, unlicensed spectrum, or a combination of licensed and unlicensed spectrum. A cell may provide coverage for a wireless service to a specific geographical area that may be relatively fixed or that may change over time.

In the ZBS method described throughout this disclosure, the coverage area of the spot beam 406 may be divided into a plurality of zones Z1-Zn indicated as 408-1 to 408-n and independent scheduling offsets may be allocated for each of the zones. Each of the plurality of zones 408-1 to 408-n may include one or more UEs from the plurality of UEs 410-1 to 410-n. The ZBS method improves upon the overall user latency by reducing the K2 and cell offset delay for low-propagation delay UEs 410-1 to 410-n within the plurality of zones of the NTN cell. The cell offset delay can be cell specific delay and can reflect the propagation delay within cell or zone. At the same time, the impact of differential doppler may also be mitigated with such a zone-based allocation strategy, since the differential delay and the Doppler shifts will be much smaller in individual NTN zones compared to a full NTN cell. Moreover, with the ZBS method, the users will use the same techniques as in the terrestrial network, since the uplink scheduling and resource block allocation is performed at the base station 402 (e.g., gNodeB) with no explicit indication to the users about the zone-allocation required. The base station 402 may need to continuously track and estimate the differential delays within each zone 408-1 to 408-n in the NTN cell 406 and reallocate UEs/users accordingly. Further, the resources are allocated to UEs 410-1 to 410-n in a hierarchical manner, e.g., first at zone-level and then at UE-level. This facilitates allocation of a different scheduling offset for different zones and therefore, scheduling-offset issue can be addressed. The base station 402 may include at least one controller to perform one or more functions of the ZBS method as discussed in greater detail below with reference to FIGS. 5 and 6.

Figure 5:
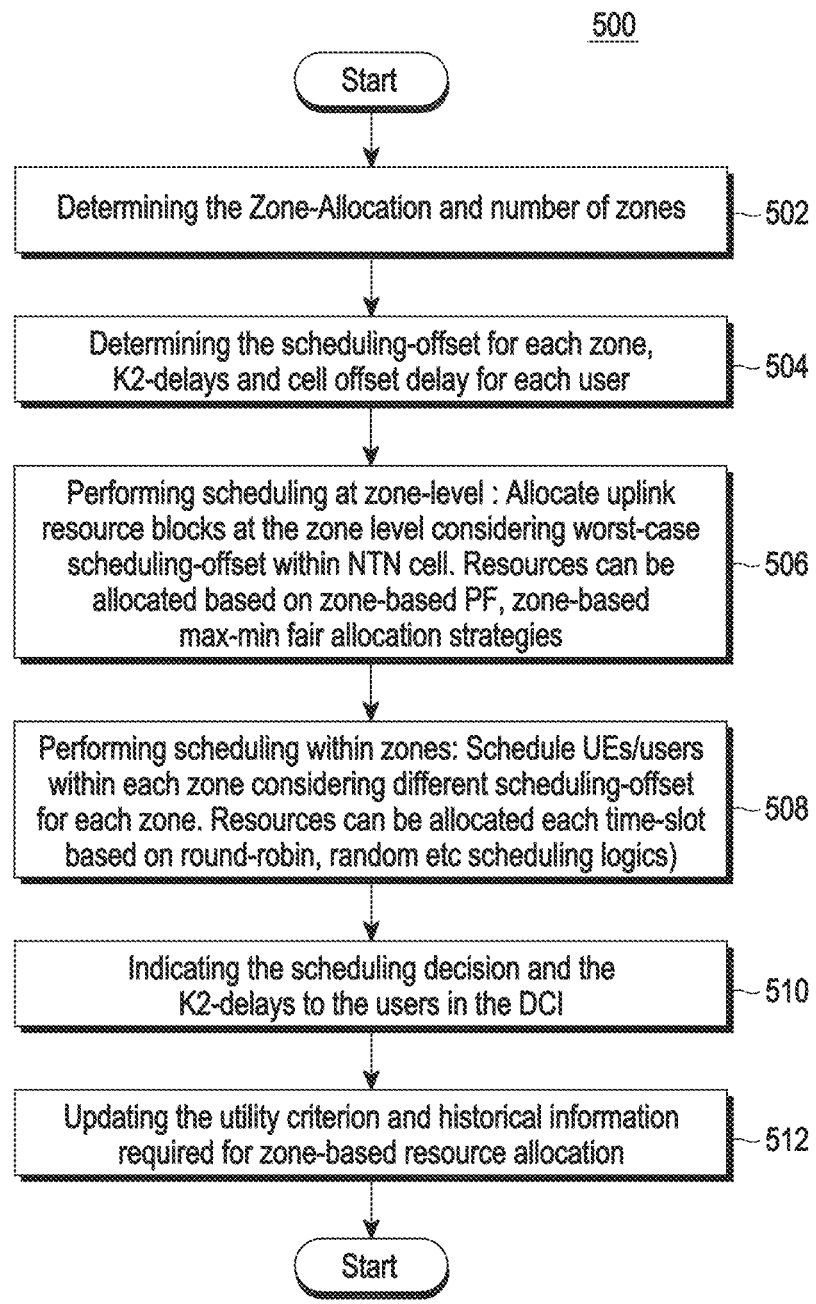
FIG. 5 is a flowchart illustrating an example Zone Based Scheduling (ZBS) method for scheduling uplink transmissions for a plurality of user equipment (UEs) in a non-terrestrial network (NTN), according to various embodiments.

FIG. 5 is a flowchart illustrating an example Zone Based Scheduling (ZBS) method for scheduling uplink transmissions for a plurality of user equipment (UEs) in a non-terrestrial network (NTN), according to various embodiments. The operations of the method 500 may be performed by a base station, e.g., base station 402.

At operation 502, the method 500 comprises determining the Zone-Allocation and number of zones. According to an embodiment, the coverage area of each spot-beam may be divided into a plurality of NTN-zones in such a manner that:

a) The differential Doppler among UEs within the same NTN-zone should be below a predefined threshold (as defined by 3GPP). This addresses the impact of differential Doppler shift in the satellite coverage area.

b) The differential delay of UEs within each NTN-zone is minimized/reduced given a pre-determined maximum number of NTN-zones per beam. Also, K2-delays for each user can be reduced. This address the scheduling offset issue in NTNs as discussed above.

In an example embodiment, the zone-allocation which satisfies the above two-conditions may be used for the ZBS method. The base station (gNodeB) may employ one or more grouping, clustering, ML/AI models for allocation of zones, such as, but not limited to, any supervised, semi-supervised, unsupervised, reinforcement learning models, density, distribution based, hierarchical, or clustering algorithms.

In an embodiment, the number of plurality of NTN-zones will depend on the variance in propagation delay and doppler latency in the system (e.g., system 400). For example, for the spot-beam at 90° elevation angle, a lesser number of NTN-zones may be created as compared to a spot-beam at 10°. Additionally, the advantages of dividing the coverage area may be reduced, if the number of NTN-zones are increased beyond a number. This is because, in such cases, though the differential delay is decreased within the NTN zones by increasing the number of NTN-zones, the scheduling advance is not impacted at all. Therefore, it is important to determine appropriate number of NTN-zones for each spot-beam to gain an advantage from ZBS method.

Doppler-Shift: To align the received frequency of the uplink transmissions, each UE needs to apply a different frequency adjustment in the uplink to compensate for its specific Doppler shift. The central question is how to determine the needed frequency adjustment at each UE. In the 3GPP Release 17 work on NTNs, the assumption is that each NTN UE is equipped with a global navigation satellite system (GNSS) chipset and can determine its position and velocity [RP-201256]. The NTN can periodically broadcast satellite ephemeris data which conveys information about the serving satellite's position and velocity. Therefore, with the known positions and velocities of the satellite and UE, the UE can estimate the DL and UL Doppler shifts. Prior to initial access, the UE can adjust its UL transmit frequency by the sum of the estimated UL and DL Doppler shifts. This helps in achieving multi-access orthogonality at the BS receiver.

Various methods for determining doppler shift may include utilizing reference signals in an OFDM carrier to estimate Doppler shift. With the estimated Doppler shift, a UE can determine the needed frequency adjustment value and apply it to frequency pre-compensation of UL transmissions so that multi-access orthogonality at the receiver is maintained. The advantages of the disclosed solution include mitigating the consequences of loss of GNSS coverage for a UE operating in an NTN, enabling a UE without GNSS capability to access an NTN, reducing the dependency of NTN operation on GNSS, among others (the GNSS signals are weak, not ubiquitous, and susceptible to interference and spoofing).

In the ZBS method, the satellite-gNodeB/base station needs to be aware of an estimate of Doppler shift experienced by each UE/user and then, allocate zones based on this doppler shift. In an embodiment, the UE may estimate Doppler Shift using any of the methods discussed above, and may explicitly indicate to the gNodeB its Doppler Shift (either accurately or discretized) via a MAC CE indication.

In an embodiment, the UE may estimates Doppler Shift using any of the methods discussed above, and request access to a particular zone from the NW (UE would request for a NTN zone which fits its Doppler shift). In this embodiment, each zone may tolerate only a particular range of Doppler shifts. This mapping may be indicated in MAC CE, RRC message or system information. The UE can determine an appropriate zone-allocation based on its Doppler estimate and inform the same to the gNodeB.

In an embodiment, the gNodeB may obtain an estimate of UE's Doppler shift based on Differential delay experienced by UE in the NTN cell, UE position (the s Differential delay, and UE position would be highly correlated and a crude estimation of Doppler shift can be made using them). In this example, the UE does not estimate Doppler shift.

At operation 504, the method 500 comprises determining a scheduling-offset, K2 delays and cell offset for each zone. In an embodiment, the base station determines the scheduling offset for each zone. The scheduling offset can be common to all users within same zone and it will calculated as discussed below.

Due to the plurality of zones, it is expected that the propagation delay will be similar for all the users in that zone.

Scheduling Offset (zone)=2*propagation delay or cell offset delay+processing delay The base station may also inform the same to the UEs through dedicated RRC messages or broadcast message. Since these messages and the mechanism to send such messages to UEs are widely known in the art, these are not discussed here in detail for the sake of brevity.

At operation 506, the method 500 comprises performing scheduling at zone-level, e.g., resource allocation (e.g., resource blocks) at zone-level of the plurality of zones. In a conventional system, all users have to be allocated resources with a common scheduling-advance, but with the discussed ZBS method, a different scheduling advance suited to the differential delay within that zone may be determined. The impact of optimal zone-allocation for ZBS Scheme may be illustrated based on an agglomerative hierarchical zone allocation strategy which provides an optimal solution for zone allocation.

Before disclosing the zone-based resource-allocation scheduling schemes, it is important to discuss the conventional scheduling logics:

Resource Allocation Mechanisms

The proportional-fair (PF) scheduler (e.g., at the controller of base station) may be configured to provide a fair distribution of resources among the set of UEs that are served by the base station (gNodeB). To obtain a fair allocation of resources s among all UEs, the PF scheduler gives priority to the UEs that have the highest ratio between the feasible rate at the current time-slot and the average rate over former successive time-slots. The PF scheduler policy to assign the user u* in the time-slot t can be expressed as:

$$u^* = \underset{u}{\mathrm{argmax}} \frac{r_u(t)}{\bar{r}_u(t-1)}$$

where $\bar{r}_u(t)$ is the average rate of user u in the time slot t, and is calculated based on an exponential moving average:

$$\bar{r}_u(t) = (1-w)\bar{r}_u(t-1) + w r_u(t)$$

where $w \in [0,1]$ is a system parameter that weights the importance of the current feasible rate with respect to the average rate when computing the average rate metric. On the other hand, the Maximise Minimum Rate (MaxMin) scheduler aims to maximise the minimum rate of the UEs. This is done by prioritising the UE with the lowest average rate. The MaxMin scheduler policy to assign the user u* in the time-slot t can be expressed as $$u^* = \underset{u}{\mathrm{argmax}} \frac{1}{\bar{r}_u(t-1)}$$

Zone-Based Resource Allocation

According to various embodiments of the present disclosure, the users/UEs within each zone will have a common scheduling offset to alleviate the scheduling-offset issue for NTN cells. This ensures that the latency of the low-propagation delay users is not unnecessarily impacted. In the ZBS method, the available uplink resources are first allocated among the NTN-zones considering the worst-case scheduling-offset and then allocated among the users within each zone considering the individual scheduling-offset for each of the zones. Also, to alleviate the doppler problem, the resources can be allocated to NTN-zones in time-domain such that only NTN-zones with differential doppler shift within the allowed limit, e.g., 950 Hz are allocated resources in the same time-slot. Different NTN-zones may be allocated resources in orthogonal time slots. Another way is to allocate adjacent sub-carriers only to adjacent NTN-zones e.g., using different carriers for different NTN-zones. The resources can be allocated at different zones based on priority.

In the ZBS scheme, independent scheduling-offsets may be allocated for each of the zones and therefore, different K2 delays or cell specific delay or Kx delay can be selected for each NTN-zone.

At operation 508, the method 500 comprises performing scheduling within the plurality of zones, e.g., resource-allocation within the plurality of zones:

The resources are allocated among the users/UEs within each zone in one of a round-robin or random or priority based manner as explained below.

Zone based Buffer-Length Based Proportional-Fair Scheduling Logic:

Let the candidate NTN zone-set to be scheduled this TTI be $Z_c$ and $BL(t, z_k)$ be the summation of buffer-length for the NTN-zone $z_k$ at slot time t. The buffer-length for each NTN-zone is obtained by the gNodeB based on the buffer status report by the UEs e.g., $BL(t, z_k) = \Sigma BL_i(t)$, $\forall$ users i $\in z_k$, where $BL_i(t)$ is buffer-length of user i at slot time t. The scheduler (e.g., controller of base station 402) calculates the buffer-length based utility function of each NTN-zone in $Z_c$. Given a total of M resource blocks (RBs) in each slot time, the disclosed function for zone $z_k$ for $m^{th}$RB in scheduling time-slot t is, $$ZBBL(t, z_k) = \frac{BL(t, z_k)/\sum_{k_k} BL(t, z_k)}{\bar{\beta}_{z_k}(t-1)}$$

where $$\bar{\beta}_{z_k}(t) = \left(1 - \frac{1}{T_w}\right) \cdot \bar{\beta}_{z_k}(t-1) + \frac{1}{T_w} \cdot \sum_{m=1}^{M} x_{z_k}(t, m)$$

where, $x_{z_k}(t, m)$ is a boolean to check whether the mth resource block is or is not occupied by the NTN-zone, $\bar{\beta}_{z_k}(t)$, is the average number of RB usage per time slot for NTN-zone $z_k$ at time t. The disclosed function allocates more resources to zones with higher buffer-length and at the same time, penalizes those NTN-zones which have higher average number of RB usage per time Zone-Based Proportional-Fair Scheduling Logic:

The zone-based proportional-fair scheduling can be achieved via various strategies. According to an embodiment, one of the methods to achieve the zone-based proportional-fair scheduling is being discussed. Let the candidate NTN zone-set to be scheduled this TTI be $Z_c$. The scheduler calculates the zone-based proportional-fair (ZB-PF) utility function of each NTN-zone in $Z_c$. Given a total of M RBs in each slot time, the disclosed function for zone $Z_k$ for $m^{th}$RB in scheduling time-slot t is, $$ZBPF(t, z_k) = \frac{D_{z_k}(t)}{\bar{R}_{z_k}(t-1)}$$

where

-continued $$\bar{R}_{z_k}(t) = \left(1 - \frac{1}{T_w}\right) \cdot \bar{R}_{z_k}(t-1) + \frac{D_{z_k}(t)}{T_w} \sum_{m=1}^{M} x_{z_k}(t, m),$$

where $x_{z_k}(t, m)$ is the RB allocated status that takes the value of 1 or 0 when the $RB_m$ is or is not occupied by the NTN-zone $z_k$, $\bar{R}_{z_k}(t)$ is calculated as the moving average rate over a window size of $T_w$ time slots for the NTN-zone $z_k$ at time t. Finally, the NTN-zone $z_k^*$ with the best ZBPF utility function values, $z_k^*$=argmaxZBPF(t, $z_k$) is selected.

Another way to design the zone-based PF scheduling function is $$ZBPF^{(2)}(t, z_k) = \frac{D_{z_k}(t)}{\bar{R}_{z_k}(t-1)} \cdot \frac{BL(t, z_k) / \sum_{z_k} BL(t, z_k)}{\bar{B}_{z_k}(t-1)}$$

The disclosed function $ZBPF^{(2)}$ accounts for both, the historical data-rate average and the pending buffer-length for each NTN-zones.

Zone-Based Max-Min Fair Scheduling Logic:

The MaxMin scheduler policy to assign the user u* in the time-slot t can be expressed as:

$$z_k^* = \underset{z_k}{\operatorname{argmax}} \frac{1}{R(t-1, z_k)}$$

The Round-robin and random scheduling strategies can be used directly at the NTN-zone-level instead of user-level in ZBS scheme.

At operation 510, the method 500 comprises indicating or transmitting the scheduling decision and the K2-delays to the users in the DCI. The base station determines the scheduling-offset for each zone and determine K2-delays and cell offset delay for each user. Cell offset delay can be different for each zone as it depends upon cell size and the number of beams serving in that zone. K2 offset depends on whether system can be FDD or TDD. In FDD, typically it can be 4 ms which is processing delay, but in TDD, it depends upon the next available uplink slot and processing delay. Alternatively, NW can also maintain single offset for all the zones, and inform the same to the UE through dedicated RRC messages or broadcast messages. K2 delay or Kx delay or cell offset delay. NW can also update the delays through physical control channel through DCI when allocating the grants.

At operation 512, the method 500 comprises updating the utility criterion and historical information required for zone-based resource allcoation. The base station may also configure the zones and inform the same to the UEs through K2 delay or cell offset delay. The base station may also create zones based on type of application, services, and priority of different UEs and accordingly prioritize when it has to allocate the resources. All above mentioned methods are applicable for NTN, HAPS, UAV and any type of non-terrestrial networks.

Figure 6:
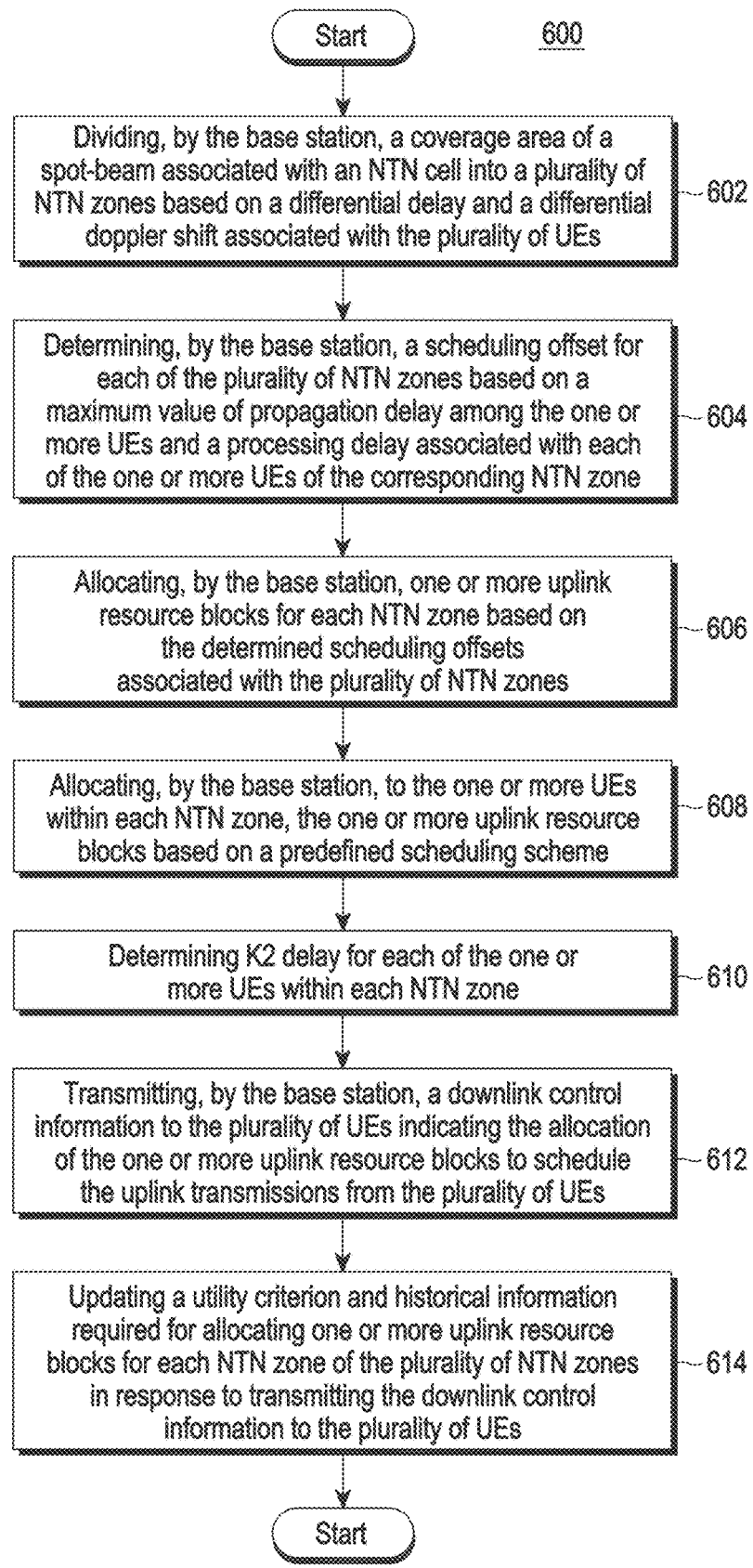
FIG. 6 is a flowchart illustrating an example method for scheduling uplink transmissions for a plurality of user equipment (UEs) in a non-terrestrial network (NTN), according to various embodiments.

FIG. 6 is a flowchart illustrating an example method 600 for scheduling uplink transmissions for a plurality of user equipment (UEs) in a non-terrestrial network (NTN), according to various. The operations of the method may be performed by a base station, e.g., base station 402. Further, the description already provided in FIG. 5 for various similar operations in FIG. 6 may not be repeated here for the sake of brevity.

At operation 602, the method 600 comprises dividing, by the base station, a coverage area of a spot-beam associated with an NTN cell into a plurality of NTN zones based on a differential delay and a differential doppler shift associated with the plurality of UEs, wherein each of the plurality of NTN zones comprises one or more UEs from among the plurality of UEs. In an embodiment, dividing the coverage area may include allocating the one or more UEs, from the plurality of UEs, to each NTN zone from the plurality of NTN zones based on a clustering of the plurality of UEs. Further, the clustering of the one or more UEs, from among the plurality of UEs, into the plurality of NTN zones may be based on minimization/reduction of the differential delay for the one or more UEs within the corresponding NTN zone, and a determination of whether a differential doppler shift associated with each of the one or more UEs within the corresponding NTN zone is below a predefined maximum threshold.

At operation 604, the method 600 comprises determining, by the base station, a scheduling offset for each of the plurality of NTN zones based on a maximum value of propagation delay among the one or more UEs and a processing delay associated with each of the one or more UEs of the corresponding NTN zone.

At operation 606, the method 600 comprises allocating, by the base station, one or more uplink resource blocks for each NTN zone based on the determined scheduling offsets associated with the plurality of NTN zones. In an embodiment, the allocating of one or more uplink resource blocks for each NTN zone of the plurality of NTN zones may include allocating the one or more uplink resource blocks for each NTN zone based on a buffer length of the corresponding NTN zone and an average number of resource blocks (RBs) usage per time slot within the corresponding NTN zone. In an embodiment, the allocating of one or more uplink resource blocks for each NTN zone of the plurality of NTN zones may include allocating the one or more uplink resource blocks for each NTN zone based on a historical data-rate average and a pending buffer-length for the corresponding NTN zone. In an embodiment, the allocating of one or more uplink resource blocks for each NTN zone of the plurality of NTN zones may include allocating the one or more uplink resource blocks for each NTN zone based on a round-robin scheduling scheme.

In an embodiment, the allocation of resource blocks (RBs) among zones is done based on Zone-based scheduling logics as defined in the slides. These could be any custom defined scheduling logics which may take into account 1) Buffer-size (the amount of data awaiting transmission across all logical channels for a user) of the users within each NTN zones 2) historical data-rate average of the users within each of the NTN zone, 3) Number and type e.g., IoT, VoIP, etc of the users within each NTN zone, etc. Based on the above parameters, custom scheduling logics may be defined to allocate resources among various zones. In NR, the RB is defined only for frequency domain. 38.211-4.4.4.1 which states: "a resource block is defined as 12 consecutive subcarriers in the frequency domain."

At operation 608, the method 600 comprises allocating, by the base station, to the one or more UEs within each NTN zone, the one or more uplink resource blocks based on a predefined (e.g., specified) scheduling scheme. In an embodiment, the scheduling scheme may include one of a round-robin scheduling, random scheduling, proportional fair scheduling, and max-min scheduling.

At operation 610, the method 600 comprises determining K2 delay for each of the one or more UEs within each NTN zone based on the scheduling offset, wherein the K2 delay for each of the one or more UEs is indicative of a minimum waiting time for the corresponding UE before an uplink transmission and is greater or equal to the processing delay, and wherein the transmitting (refer to operation 612 below) comprises transmitting the K2 delay to each of the plurality of UEs.

At operation 612, the method 600 comprises transmitting, by the base station, a downlink control information to the plurality of Ues indicating the allocation of the one or more uplink resource blocks to schedule the uplink transmissions from the plurality of UEs. In an embodiment, transmitting the downlink control information to the plurality of UEs comprises transmitting a 4-bit field associated with a time domain resource assignment indicating an allocation of the one or more uplink resource blocks to the plurality of UEs.

At operation 614, the method 600 comprises updating a utility criterion and historical information required for allocating one or more uplink resource blocks for each NTN zone of the plurality of NTN zones in response to transmitting the downlink control information to the plurality of UEs.

While the operations are illustrated and described in a sequence in FIGS. 5 and 6, these operations may occur in variations to the sequence in accordance with the various example embodiments.

Figure 7:
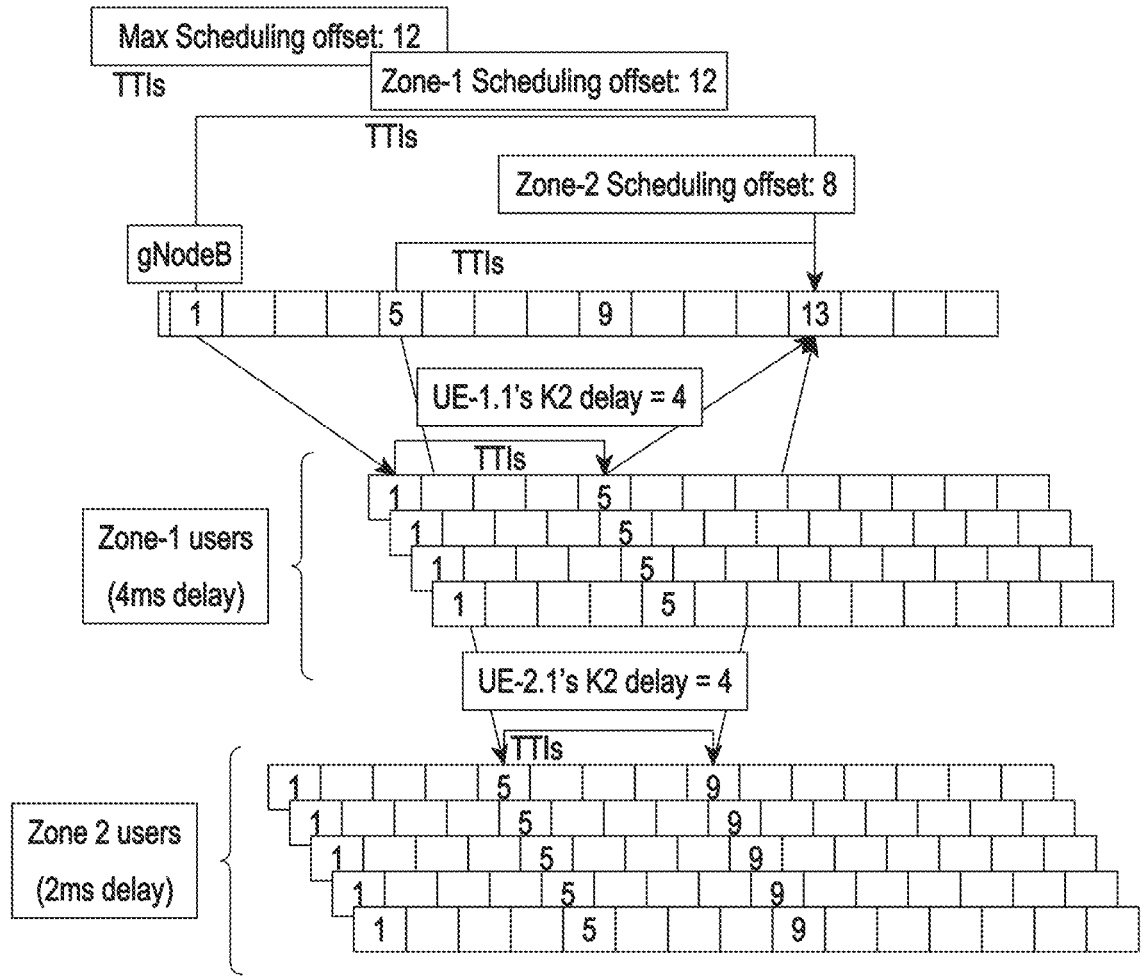
FIG. 7 is a diagram illustrating an example impact of scheduling delay due to scheduling offset and K2 delay in NTN systems, according to various embodiments.

FIG. 7 is a diagram illustrating example impact of scheduling delay due to scheduling offset and K2 delay in NTN systems, according to various embodiments.

As illustrated in FIG. 7, the impact of scheduling delay due to different s scheduling offset has been shown for two different zones, each zone with a different propagation delay and comprising one or more UEs/users. In the illustrated example, the zone 1 UEs may have a propagation delay of 6 ms, while the zone 2 UE2 may have a propagation delay of 2 ms. The different propagation delays may be based on different locations of the UEs/zones within an NTN cell coverage.

In the illustrated example, based on implementation of the ZBS method discussed above, the gNodeB may perform zone-level scheduling for TTI #13 in TTI #1. For example, X % of the resources in TTI #13 would be allocated to zone-1 users and rest would be allocated to zone-2 users. Zone-level grant allocation will not be communicated to UEs. Further, the resource allocation of resource blocks among users/UEs in zone-1 may be performed in TTI #1 for TTI #13 (since, scheduling offset=12 slots), e.g., scheduling for zone-1 UEs for TTI #13 would be performed in TTI #1 among the X % resources allocated to zone-1 previously. Zone-level grant allocation will be indicated to UEs in zone-1.

Additionally, the resource allocation among users in zone-2 may be performed in TTI #5 for TTI #13 (since scheduling offset=8 slots), e.g., scheduling for zone-2 UEs for TTI #13 would be performed in TTI #5 among the (100-X)% resources allocated to zone #1 in gNodeB's TTI #1. The zone-level grant allocation will be indicated to UEs in zone-1.

Based on the grant/allocation to the UEs, the UE-1 in zone 1 may be configured to transmit in TTI #5 for gNodeB's TTI #13.

K2 delay=Scheduling-offset−2*prop-delay=12−2*4=4 (=processing delay)

Similarly, the UE-2 in zone 2 transmits in TTI #9 for gNodeB's TTI #13.

K2 delay=Scheduling-offset−2*prop-delay=8−2*2=4 (=processing delay)

Therefore, with ZBS method, in the given example, the K2-delay, e.g., the waiting time for UE has been reduced to its minimum value, e.g., the processing delay for users within both zones.

Further, as an alternative to zone based scheduling (ZBS) method discussed above, the base station/network may choose scheduling-offset based on worst-case propagation delay in each NTN cell. In the worst-case propagation delay based method:

the base station/network can configure a high number of spot-beams for the satellite, keeping different scheduling-offset for each beam. This way it can reduce the different propagation delay within the serving beam.

The scheduling-offset for each spot-beam (NTN cell) can be determined based on maximum propagation delay within the NTN cell.

Multiple beams ensure that each zone will have different scheduling offset and different scheduler to serve the users. The base station/network can serve the users as per existing techniques.

Furthermore, as another alternative to zone base scheduling, the base station/network may provide SPS grants for NTN cells:

In conventional solutions, SPS configuration is based on type of service.

For NTN, the base station/network can allocate the SPS grants based on type of service and decide periodicity based on propagation delay between the UE and NW.

Periodicity is currently decided based on type of service and traffic generation but in this case periodicity can be based on propagation delay. This way the UE already has pre-configured grants and it can avoid the propagation delay for one side and can overall improve the performance Propagation delay based SPS periodicity ensures that UE will have pre-configured grants. NW can send the SPS grants to the UE along with type of grants and periodicity. NW can also configure grant free allocation where UE will already be configured with grants and UE can use it as per required.

Figure 8:
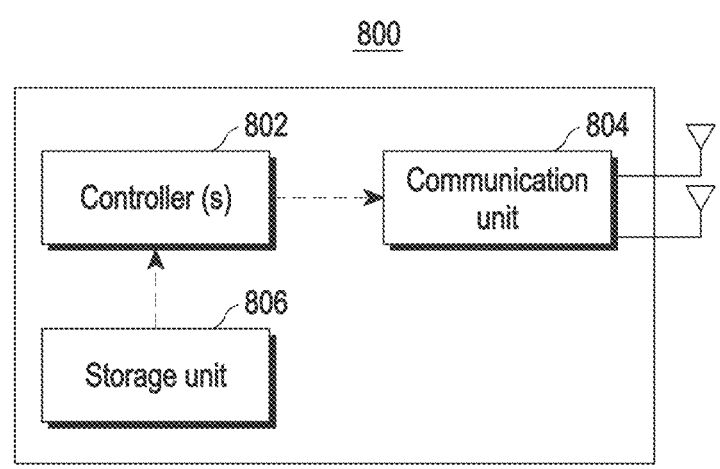
FIG. 8 is a block diagram illustrating an example configurationof a base station in a wireless communication system, according to various embodiments.

FIG. 8 is a block diagram illustrating an example configuration of a base station 800 in a wireless communication system, according to various embodiments. The configuration of FIG. 8 may be understood as a part of the configuration of the base station as discussed throughout this disclosure. Hereinafter, it is understood that terms including "unit" or "module" at the end may refer to the unit for processing at least one function or operation and may be implemented in hardware, software, or a combination of hardware and software.

Referring to FIG. 8, the base station 800 may include at least one controller (e.g., including processing circuitry) 802 (or a processor), a communication unit (e.g., including communication circuitry) 804 (e.g., communicator or communication interface), and a storage unit 806 (e.g., storage or memory). By way of example, the base station 800 may refer to a radio equipment that communicates with a plurality of UEs in an NTN network. The communication unit 804 may include various communication circuitry and perform functions for transmitting and receiving signals via a wireless channel.

As an example, the controller 802 may be a single processing unit or a number of units, all of which could include multiple computing units. The controller 802 may be implemented as one or more microprocessors, microcomputers, microcontrollers, digital signal processors, central processing units, state machines, logic circuitries, and/or. any devices that manipulate signals based on operational instructions. Among other capabilities, the controller 802 is configured to fetch and execute computer-readable instructions and data stored in the memory. The controller 802 may include one or a plurality of processors. At this time, one or a plurality of controller 802 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of controllers 802 may control the processing of data in accordance with a predefined operating rule stored in the non-volatile memory and the volatile memory, e.g., storage/memory unit 806.

The storage unit/memory 806 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The controller 802 may include one or more modules which are configured to perform one or more functions discussed herein, such as dividing a coverage area, determination of scheduling offset, K2 delay, allocation of uplink resource blocks, and transmitting of downlink control information to the UEs. Further, the controller 802 may be configured to execute the operations of methods discussed above in FIGS. 5 and 6.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiments(s) described herein may be used in conjunction with any other embodiment(s) described herein.

What is claimed is:

1. A method for scheduling uplink transmissions for a plurality of user equipment (UEs) in a non-terrestrial network (NTN), the method comprising:
    dividing a coverage area of an NTN cell into a plurality of NTN zones, wherein each of the plurality of NTN zones include one or more UEs from among the plurality of UEs;
    determining a scheduling offset for each of the plurality of NTN zones based on a maximum value of propagation delay among the one or more UEs and a processing delay associated with each of the one or more UEs of a corresponding NTN zone;
    determining one or more uplink resource blocks for each NTN zone based on the determined scheduling offsets associated with the plurality of NTN zones;
    allocating, to the one or more UEs within each NTN zone, the one or more uplink resource blocks based on a specified uplink transmission scheduling scheme; and
    transmitting downlink control information to the plurality of UEs indicating the allocation of the one or more uplink resource blocks to schedule the uplink transmissions from the plurality of UEs,
    wherein determining one or more uplink resource blocks for each NTN zone of the plurality of NTN zones comprises one of:
        determining the one or more uplink resource blocks for each NTN zone based on a buffer length of the corresponding NTN zone and an average number of resource blocks (RBs) usage per time slot within the corresponding NTN zone;
        determining the one or more uplink resource blocks for each NTN zone based on a historical data-rate average and a pending buffer-length for the corresponding NTN zone; or
        determining the one or more uplink resource blocks for each NTN zone based on a round-robin scheduling scheme.

2. The method as claimed in claim 1, wherein dividing the coverage area comprises allocating the one or more UEs from the plurality of UEs, to each NTN zone from the plurality of NTN zones based on a clustering of the plurality of UEs.

3. The method as claimed in claim 1, wherein the dividing comprises dividing the coverage area of the NTN cell into the plurality of NTN zones based on a differential delay and a differential doppler shift associated with the plurality of UEs.

4. The method as claimed in claim 3, wherein dividing the coverage area comprises:
    clustering the one or more UEs from among the plurality of UEs, into the plurality of NTN zones based on minimization of the differential delay for the one or more UEs within the corresponding NTN zone; and
    determining whether a differential doppler shift associated with each of the one or more UEs within the corresponding NTN zone is below a specified maximum threshold.

5. The method as claimed in claim 1, wherein the scheduling scheme comprises one of a round-robin scheduling, random scheduling, proportional fair scheduling, or max-min scheduling.

6. The method as claimed in claim 1, further comprising:
    determining a K2 delay corresponding to a slot offset, where K2 is a positive integer, for each of the one or more UEs within each NTN zone based on the scheduling offset, wherein the K2 delay for each of the one or more UEs indicates a minimum waiting time for the corresponding UE before an uplink transmission and is greater than or equal to the processing delay, and wherein the transmitting comprises transmitting the K2 delay to each of the plurality of UEs.

7. The method as claimed in claim 1, comprising:
    updating a utility criterion and historical information required for determining the one or more uplink resource blocks for each NTN zone of the plurality of NTN zones in response to transmitting the downlink control information to the plurality of UEs.

8. The method as claimed in claim 1, wherein transmitting the downlink control information to the plurality of UEs comprises transmitting a 4-bit field associated with a time domain resource assignment indicating an allocation of the one or more uplink resource blocks to the plurality of UEs.

9. A base station configured to schedule uplink transmissions for a plurality of user equipment (UEs) in a non-terrestrial network (NTN), the base station comprising:
    memory (806) storing one or more computer programs; and
    at least one controller including controller circuitry,
    wherein the one or more computer programs include computer-executable instructions that, when executed by the one or more processors individually or collectively, cause the base station to:

divide a coverage area of an NTN cell into a plurality of NTN zones, wherein each of the plurality of NTN zones comprises one or more UEs from among the plurality of UEs;

determine a scheduling offset for each of the plurality of NTN zones based on a maximum value of propagation delay among the one or more UEs and a processing delay associated with each of the one or more UEs of a corresponding NTN zone;

determine one or more uplink resource blocks for each NTN zone based on the determined scheduling offsets associated with the plurality of NTN zones;

allocate to the one or more UEs within each NTN zone, the one or more uplink resource blocks based on a specified uplink transmission scheduling scheme; and transmit downlink control information to the plurality of UEs indicating the allocation of the one or more uplink resource blocks to schedule the uplink transmissions from the plurality of UEs, wherein to determine the one or more uplink resource blocks for each NTN zone, the instructions, when executed by the at least one controller individually or collectively, further cause the base station to perform one of:

determine the one or more uplink resource blocks for each NTN zone based on a buffer length of the corresponding NTN zone and an average number of resource blocks (RBs) usage per time slot within the corresponding NTN zone;

determine the one or more uplink resource blocks for each NTN zone based on a historical data-rate average and a pending buffer-length for the corresponding NTN zone; or determine the one or more uplink resource blocks for each NTN zone based on a round-robin or a random scheduling logic.

10. The base station as claimed in claim 9, wherein to divide the coverage area, the instructions, when executed by the at least one controller individually or collectively, further cause the base station to:

allocate the one or more UEs from the plurality of UEs, to each NTN zone from the plurality of NTN zones based on a clustering of the plurality of UEs.

11. The base station as claimed in claim 9, wherein to divide the coverage area, the instructions, when executed by the at least one controller individually or collectively, further cause the base station to divide the coverage area of the NTN cell into a plurality of NTN zones based on a differential delay and a differential doppler shift associated with the plurality of UEs.

12. The base station as claimed in claim 11, wherein to divide the coverage area, the instructions, when executed by the at least one controller individually or collectively, further cause the base station to:

cluster the one or more UEs, from among the plurality of UEs, into the plurality of NTN zones based on minimization of the differential delay for the one or more UEs within the corresponding NTN zone; and determine whether a differential doppler shift associated with each of the one or more UEs within the corresponding NTN zone is below a specified maximum threshold.

13. The base station as claimed in claim 9, wherein the scheduling scheme comprises one of a round-robin scheduling, random scheduling, proportional fair scheduling, or max-min scheduling.

14. The base station as claimed in claim 9, wherein the instructions, when executed by the at least one controller individually or collectively, further cause the base station to determine a K2 delay corresponding to a slot offset, where K2 is a positive integer, for one or more UEs within each NTN zone based on the scheduling offset, wherein the K2 delay for each of the one or more UEs indicates a minimum waiting time for the corresponding UE before an uplink transmission and is greater than or equal to the processing delay, and wherein the transmitting comprises transmitting the K2 delay to each of the plurality of UEs.

15. The base station as claimed in claim 9, wherein the instructions, when executed by the at least one controller individually or collectively, further cause the base station to:

update a utility criterion and historical information required for determining the one or more uplink resource blocks for each NTN zone of the plurality of NTN zones in response to transmitting the downlink control information to the plurality of UEs.

16. The base station as claimed in claim 9, wherein to transmit the downlink control information to the plurality of UEs, the instructions, when executed by the at least one controller individually or collectively, further cause the base station to transmit a 4-bit field associated with a time domain resource assignment indicating an allocation of the one or more uplink resource blocks to the plurality of UEs.

* * * * *